United States Patent [19]
Benton et al.

[11] 3,872,050
[45] Mar. 18, 1975

[54] POLYURETHANE LIQUID CRYSTAL DISPERSION SYSTEM AND DEVICES

[76] Inventors: William J. Benton, 1046 Murray Hill Ave.; Joseph R. Quigley, 6611 Ridgeville St., both of Pittsburgh, Pa. 15217

[22] Filed: Aug. 9, 1973

[21] Appl. No.: 387,110

Related U.S. Application Data

[63] Continuation-in-part of Ser. No. 273,105, July 19, 1972, abandoned.

[52] U.S. Cl. ............ 260/37 N, 250/83 R, 252/408, 260/18 TN, 260/75 TN, 260/77.5 AN, 260/77.5 AM, 260/77.5 AP, 350/160 LC
[51] Int. Cl. .............................. G02s 1/16
[58] Field of Search .............. 252/408; 350/160 LC; 250/83 R; 260/18 TN, 37 N, 77.5 AM, 77.5 AN, 75 TN, 77.5 AP

[56] References Cited
UNITED STATES PATENTS

| | | | |
|---|---|---|---|
| 3,114,836 | 12/1963 | Fergason et al. | 250/83 |
| 3,512,183 | 5/1970 | Sharp et al. | 260/37 |
| 3,585,381 | 6/1971 | Hodson | 250/83 |
| 3,600,060 | 8/1971 | Churchill et al. | 360/160 |
| 3,620,889 | 11/1971 | Baltzer | 250/83 |
| 3,650,603 | 3/1972 | Heilmeier | 252/408 |
| 3,666,947 | 5/1972 | Haas et al. | 250/83 |
| 3,711,713 | 1/1973 | Wysocki et al. | 250/83 |

*Primary Examiner*—Eugene C. Rzucidlo

[57] ABSTRACT

Liquid crystal materials, particularly cholesteric liquid crystal materials, are protected against dust, contamination and the like by being dispersed as discrete naked aggregates in polyurethane materials. The liquid crystal material is mixed with polyurethane-elastomer or polyurethane polymers and thereafter polymerization or drying of the mixture precursors is carried out. The liquid crystal material is uniformly dispersed in the polyurethane without experiencing chemical degradation. Films, sheets, or other three-dimensional forms of polyurethane polymer containing dispersed liquid crystals can then be used as temperature indicators, stress indicators, or for other purposes, e.g., novelty items and toys. In certain installations the iridescence of the product achieves useful aesthetic properties.

16 Claims, 2 Drawing Figures

PATENTED MAR 18 1975

3,872,050

POLYURETHANE LIQUID CRYSTAL DISPERSION SYSTEM AND DEVICES

C. REFERENCES TO RELATED APPLICATIONS

This application is a continuation-in-part of copending application Ser. No. 273,105 now abandoned filed July 19, 1972

D. BACKGROUND OF THE INVENTION

Certain chemical compounds at appropriate temperatures, are in a liquid state and at the same time behave in ways that show that the molecules of the liquid are not randomly arranged as in the ordinary isotropic liquid, but have some degree of order such as is most commonly encountered in the solid state. These compounds are called ordered fluids, or liquid crystals, and have been classified into the nematic, smectic, and cholesteric phases. In carrying forth the invention about to be described, the cholesteric phase liquid crystal materials are of particular interest, since they have the interesting property of selective scattering mentioned in U.S. Pat. No. 3,114,836. That is, they will, as thin films, show different apparent colors depending upon their temperature, the angle of observation and the applied shear stress. Such thin films have been used, for example, for temperature mapping of a surface and for thickness measurements.

Many of the problems encounted in the practical utilization of liquid crystals stem from the lack of effective ways to protect and distribute the liquid crystal substance. Liquid crystals have been treated by microencapsulation processes to produce microencapsulated discrete globs of the liquid crystal, each coated with a water soluble jacket such as gelatin - gum arabic, polyvinyl alcohol, zein and the like, see U.S. Pat. No. 3,585,381. If the liquid crystals are not encapsulated and are left exposed to the atmosphere, the collection of foreign particles from the atmosphere will render the liquid crystals useless by providing sites for crystallization and by contaminating the purity of the delicately balanced mesomorphic state. It is also advantageous to shield the liquid crystals from contact with atmospheric oxygen since oxidation deteriorates many liquid crystal systems. It is also advantageous to shield the liquid crystals from ultra-violet radiation, another major cause of degradation and relatively short life span. It is desirable to provide a means for protecting the liquid crystals within a matrix of transparent or relatively transparent material in such a way that the liquid crystal dispersion is securely held in the matrix so that it will not slip or flow but will still retain its inherent properties (selective scattering, temperature and shear sensitivity, etc.).

Several methods for protecting liquid crystals have been developed, some of which are described in the following: British Patent No. 1,161,039, U.S. Pats. No. 3,585,381, No. 3,600,060, and No. 3,620,889. The present invention describes a protection method involving the dispersion of naked liquid crystal aggregates within a polyurethane matrix.

E. SUMMARY OF THE INVENTION

In accordance with the present invention, a dispersion of naked aggregates of liquid crystal material is provided wherein the liquid crystal material, particularly a cholesteric or cholesteric-nematic liquid crystal, is dispersed within a polyurethane material without reacting with the polyurethane itself.

Polyurethanes are polymers having more than one urethane linkage in each molecule. Typically polyurethanes are formed by reacting a polyisocyanate with a compound having at least one active hydrogen as determined by Zerewitinoff method e.g., polyols, polyamines, polyamides or mixtures thereof. The polyols are most readily available and hence most utilized. Other polyurethanes can be prepared as lacquers wherein the polyisocyanate is combined with a co-reactive compound which has some additional polymerizable site, e.g., castor oil. The resulting thermoplastic polymer is dissolved in a solvent and applied as a coating. Upon volatilization of the solvent, the thermoplastic polymer may condense through the polymerizable sites of the co-reactive compound.

The liquid crystals can be employed with both types of polyurethane to good advantage. The liquid crystals are used in quantities ranging from about 0.1 to 1.5 (preferably 0.3 - 1.5) parts of liquid crystal by weight for each one part of the polyurethane polymer by weight.

In the lacquer applications, the liquid crystal medium is emulsified in the solvent solution of polymerizable urethane polymers. In the other applications, the liquid crystal medium is dispersed throughout the co-reactive compound prior to mixing with the polyisocyanate ingredient.

After mixing, the polyurethane liquid crystal dispersion is cast, polymerization subsequently occurring in a manner dependent upon the type of polyurethane involved. The liquid crystal material forms in discrete naked aggregates within the cured polyurethane matrix. This cast and cured polyurethane liquid crystal dispersion can then be used, for example, in a test device, for surface temperature measurement, to indicate the stress or pressure to which a body has been subjected, as a vapor detection device, or other applications.

F. BRIEF DESCRIPTION OF THE DRAWINGS

G. DESCRIPTION OF PREFERRED EMBODIMENTS

Figure 1:
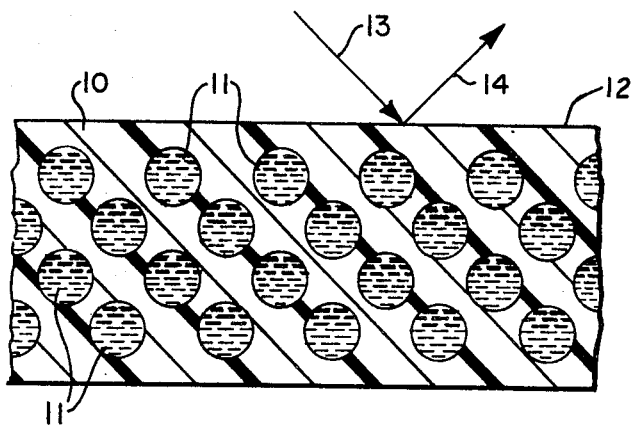
FIG. 1 is a schematic illustration of a relaxed mass of urethane polymer having uniformly dispersed therein naked aggregates of liquid crystals according to the invention.

The color changes which occur with the present dispersions of naked aggregates of liquid crystals in polyurethane can be illustrated by reference to FIGS. 1 and 2 wherein FIG. 1 shows in cross-section a mass 10 urethane polymer having uniformly dispersed therein naked aggregates 11 of liquid crystals. The mass 10 of FIG. 1 is in its relaxed state. Light striking the surface 12 at an incident 13 will be reflected at 14.

Figure 2:
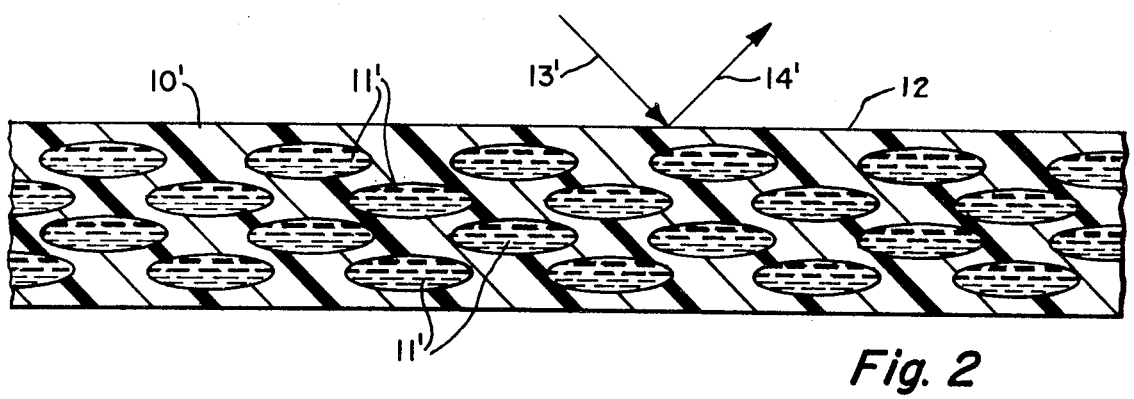
FIG. 2 is a schematic illustration, showing in a stretched condition, the mass of urethane polymer of FIG. 1.

As the mass 10' is stretched as in FIG. 2, the naked aggregates 11' change in shape and the light incident at 13' will be reflected at 14'.

If the normal relaxed reflected light at 14 (FIG. 1) is green, then the tensioned mass reflected light at 14' (FIG. 2) will be blue. The color shift toward shorter wave-lengths during the act of stretching is pronounced. The tensioned mass retains a color different from the relaxed mass.

A shift in color toward longer wave-lengths, i.e., yellow and orange, will occur if the mass 10 (FIG. 1) is compressed.

The stressed material, whether in compression or in tension, will retain a color which differs from the color of the relaxed material. So long as the mass remains stressed, the color will tend to revert to that of the relaxed mass. The time for reversion depends upon a number of factors, e.g., the amount of stress; the size of the liquid crystal naked aggregates; the concentration of the aggregates; the nature of the liquid crystals; and others.

For optimum visible response to stress, the liquid crystal component should be temperature-insensitive at temperatures below 100°F.

Optimum visible response of liquid crystals is achieved when dark, preferably black surfaces are available as a supporting surface. Alternatively the liquid crystals may be darkened by dyes or pigments.

Urethane polymers, also known as isocyanate polymers, are well know materials with a principal commercial use in plastic foams. The present invention is concerned with urethane polymers other than foamed materials, frequently distinguished by the expressions urethane elastomers or urethane coatings or urethane castings. The adhesive properties of urethane polymers also is well known and is a useful characteristic in some applications of this invention. See Encyclopedia of Chemical Technology, Interscience Encyclopedia, Inc., N. Y., 1957, Pp. 888–908.

The American Society for Testing Materials (ASTM-D-16-72) has cataloged urethane coatings into six types as follows:

TYPE I — One-package pre-reacted — urethane coatings characterized by the absence of any significant quantity of free isocyanate groups;

TYPE II — One-package moisture cured — urethane coatings characterized by the presence of free ixocyanate groups and capable of conversion to useful films by the reaction of the isocyanate groups with ambient moisture.

TYPE III — One-package heat cured — urethane coatings that dry by thermal release of blocking agents and regeneration of active isocyanate groups that subsequently react with substances containing active hydrogen.

TYPE IV — Two-package polyol — urethane coatings that comprise systems wherein one package contains a prepolymer or adduct or other polyisocyanate capable of forming useful films by combining with a relatively small quantity of catalyst, accelerator, or cross-linking agent such as a monomeric polyol or polyamine contained in a second package.

TYPE V — Two-package polyol-urethane coatings that comprise systems wherein one package contains a prepolymer or adduct or other polyisocyanate capable of forming useful films by combining with a substantial quantity of a second package containing a resin having active hydrogen groups with or without the benefit of a catalyst.

TYPE VI — One-package non-reactive lacquer-urethane solution coatings characterized by the absence of any significant quantity of free isocyanate groups or other functional groups.

When the liquid crystals are mixed into the polyurethane forming ingredients, they readily disperse into discrete naked aggregates, e.g., miscible individual droplets which retain their identity and do not significantly coalesce or dissolve. Gentle mixing is all that is required to disperse the liquid crystals. The expression "naked aggregate" as used herein is intended to distinguish the form in which the present liquid crystals are presented. The term "naked aggregate" is to be distinguished from encapsulated particles of the liquid crystal. As the polymerization of the polyurethane proceeds, the polyurethane forms a continuous matrix in which the discrete naked aggregates of liquid crystal are presented as a dispersed phase. The aggregate size appears to be a complex function of a number of factors including (1) the time required for the polyurethane to solidify, (2) the viscosity of the polyurethane and liquid crystal components which in turn is a function of the temperature of the system, (3) the concentration of the liquid crystal components, (4) the polarity of the polyurethane system as defined by the C*H distance between group linkages, and (5) relative surface tension interaction of the liquid crystal and the polyurethane system.

It is one objective of the present invention to introduce as much of the liquid crystal into the polyurethane as can be achieved without objectionable subsequent exudation. The visible phenomenon of the liquid crystals is maximized thereby.

In general the naked aggregate sizes have been observed in the range of 0.1 micron to about 300 microns aggregate size for color reflection appears to be in the range of 0.5 micron to about 50 microns. It should be noted that the final aggregate size has an influence on the quality of reflected color in the product but is not a factor in determining the success or failure of the protection provided for the liquid crystal medium.

The polymerized product should contain at least 20 percent by weight of the liquid crystals and preferably at least 30 percent by weight. For coating applications, the coating composition should have a weight ratio of liquid crystals to polymer of at least 0.3.

The present polyurethane curing occurs in the substantial absence of any blowing agent. Preferably the cure is carried out with vacuum degassing to extract any gas bubbles. may be formed within the polyurethane matrix.

The polyurethane elastomer in the cured condition is preferably readily stretchable, that is the modulus of elasticity should be less than 5,000 p.s.i. In this form the material can be shaped into thin films as well as thick cast articles. In film form, the product has applicability in biomedical detection and research, e.g., medical thermograms, in detection of human pulse, breast cancer, placenta locating procedures and the like. The film will present a visible response when subjected to temperature change or tension or compression changes. A film of the flexible product for example can be strapped around the wrist of a medical patient to serve as a visible indicator of blood pulsations.

A film of the material might be strapped about a medical patient's breast area to identify incidents of breast cancer which tends to result in irregular topological temperature distributions. Likewise in the placenta locating techniques for maternity patients, a thin film of the flexible product will indicate the location of the placenta within the abdomen of the maternity patient.

Flexible films preferably have a thickness from 0.5 to 20 mils.

The flexible film also can be employed in scientific and engineering determinations where temperatures and stresses are to measured.

In larger cast parts, the product might be employed as a fragmentary insert within an automobile tire to replace at least a portion of the rubber and to give an indication of stress and temperature response while the tire is undergoing tests. It is within the scope of the invention to construct an entire automobile tire of the type which employs rubber and fibrous reinforcements, using the present polyurethane elastomer containing the dispersion of naked aggregates of liquid crystals in place of the conventional rubber component of the tire. Such an automobile tire would be extremely useful for testing purposes. Alternatively a flexible film of the elastomer can be adhered to selected surface areas of the tire or molded into the side wall The liquid crystal component may also contain suitable dark dyes, about 0.5 to 5 percent by weight, such as black dyes to improve the visibility of the color response of the liquid crystals.

Polyurethane systems frequently require extended periods (up to a month) to achieve a complete cure where the system is non-catalyzed or lightly catalyzed. It has been observed that the polyurethane dispersions of liquid crystals of this invention frequently do not achieve optimum reflection and color quality until the cure has neared completion. The color phenomenon is manifested almost immediately upon initial cure but improves as the degree of curing advances.

The selection of the liquid crystal is a separate highly developed art. The liquid crystal material can be temperature stabilized in which case the product is sensitive to mechanical stress. Alternatively the liquid crystal can be temperature sensitive and can be sensitized to respond at different temperatures and fruther can be sensitized to respond over various ranges of temperatures, all more or less within the skill of the liquid crystal artisans. The liquid crystals which are preferred include as examples: cholesteryl esters such as

| | |
|---|---|
| chloride | iodide |
| bromide | cinnamate |
| oleyl carbonate | acetate |
| nonanoate | hexanoate |
| linolineate | oleate |
| laurate | caproate |
| myristrate | hydrogen phthalate |
| benzoate | |

2-(2-ethoxy, ethoxy) ethyl carbonate and other liquid crystals such as p-methoxy-benzilidine-p-n-butyl aniline, known as MBBA.

The liquid crystal may also be combined with suitable ultraviolet radiation absorbers to increase the longevity and light fastness of the resulting product. A suitable absorber is (4-ethoxy phenylazo) Phenylhexonaoate. The ultraviolet radiation absorber can be included between 1 and 5 percent by weight of the liquid crystal ingredient. Other additives for the liquid crystal might include surfactants, antioxidants and dyes.

Another useful application of the products of the present invention is in wire insultation. The present polyurethane materials can be employed as a wire insultation itself or as a coating to be applied continuously or discontinuously to wiring. In the event of overloading of the wiring, the present coating will visibily indicate the location of hot spots in the system.

A polyurethane containing a dispersion of the liquid crystals according to this invention can be used as a potting compound for electrical components. Malfunctions of the parts can be detected rapidly as a result of the visible color indication associated with hot spots.

The present polyurethane liquid crystal dispersions present a visible response to mechanical stress. Because the polyurethanes can be made rubbery and stretchable this property is particularly useful with the present invention. Temperature insensitive (also known as temperature stabilized) cholesteric liquid crystals are dispersed in the polyurethane for achieving the mechanical stress response. When a polyurethane dispersion of liquid crystals according to this invention is stretched for example 100 percent in length, a transitory color change occurs during the act of stretching the material. The intensity of the color change is dependent upon the rate of stretching.

Because the material has independent strength as a flexible film, and can be employed without the structural support of a substrate, the medical applications of the product in thin flexible, elastic, self-supporting films are numerous. A temperature sensitive film (that is a film of polyurethane containing dispersed therein a temperature sensitive liquid crystal) can be stretched over portions of the human body to provide useful medical thermograms.

The present polyurethane dispersions of liquid crystals also can be employed in combination with bioelectric polyurethane products which are known in the art for conducting electricity. Such bioelectric polyurethanes consist of polyurethane elastomers which are filled with large quantities of carbon black to the degree where the carbon black filled polyurethane becomes electrically conductive although it has a high electrical resistance. Such bioelectrical polyurethane conductors can be wrapped or coated with the present polyurethane dispersions or liquid crystals so that the temperature of the bioelectric polyurethane conductor can be monitored remotely.

MEMORY PHENOMENON

The present liquid crystal dispersions in the temperature stabilized version have a capacity to retain a visible mark when depressed. For example if a hard object such as a pen or fingernail is depressed into and moved across the surface of the substance, a visible mark remains for several days. However if the article is heated to a temperature above the mesomorphic temperature of the particular liquid crystal, the visible mark disappears. When the liquid crystal returns to its mesomorphic state the article is restored to its original condition. This provides a means for simply retaining and erasing visible indications.

EXAMPLE I

A formulation which can be used as a temperature-sensitive coating applicable by brush, dip or spray.

An oil-modified polyurethane (Spencer-Kellogg F78-50MS) comprising linseed oil reacted with toluene diisocyanate reduced in mineral spirits was employed. The liquid crystal used was a mixture of 40 percent cholesteryl oleyl carbonate, 55 percent cholesteryl nonanoate, and 5 percent cholesteryl benzoate. The resulting liquid crystal mixture has a temperature response from 29° (red) to 32.5°C (blue).

Ten grams of the oil-modified polyurethane solution was poured into a glass beaker and to this was added 5 grams of the cholesteric mixture. These components were mixed by mechanical stirring and degassed in a vacuum system. A 5 mil film of the mixture was brush coated onto a substrate of black 3 mil acrylic film. Solvent evaporation for a tack-free cure was achieved after 6 hours, after which the coated sheet was dipped in petroleum ether to remove the excess liquid crystals from the top surface of the coating. A subsequent final cure was achieved after 48 hours.

The resulting film exhibited a matte-like surface appearance, and excellent color reflections with changing temperature. This polyurethane cures not by a reaction of =NCO groups, but by solvent evaporation and condensation. Hence these formulations may be stored entirely mixed and ready for use. These systems display the most fragile mechanical properties. They are best employed as a coating on a mechanically suitable substrate.

EXAMPLE II

The product of Example I received a 2 mil top coating of the same oil-modified pre-reacted polyurethane in mineral spirits (Spencer Kellogg F78-50MS) by brush coating on top of the matte-like surface. This gives added protection to the liquid crystals and gives the film more durable mechanical properties, as well as creating a glossy surface appearance as opposed to the matte surface appearance. The article exhibited visible color changes in the temperature range 29° to 32.5°C.

EXAMPLE III

A highly elastic polyurethane elastomer and a temperature stabilized cholesteric liquid crystal produce a product which when deformed, displays a color change from the shear response of the dispersed liquid crystals.

The polyurethane was CONATHANE TU-50A, a toluene diisocyanate polyether based prepolymer with a free =NCO content of 6 percent and a polyether-amine base polyol misture. CONATHANE is a trademark of Conap, Inc. The resulting polyurethane shows an ultimate elongation of approximately 920 percent. In this example, 60 grams of a red mixture of 70 percent oleyl cholesteryl carbonate and 30 percent cholesteryl chloride was prepared. Two percent of a carbonaceous black color concentrate (Conap DS-1822) was added to this mix, with thorough mixing to evenly distribute the black concentrate within the liquid crystal. One hundred grams of the diisocyanate terminated prepolymer (CONATHANE TU-50A, part A) and 79 grams of the polyether-amine-based polyol mixture (CONATHANE TU-50A, part B) were accurately weighed in separate glass containers. Thereafter, CONATHANE TU-50A part B and the prepared liquid crystal-dye formulation (60 grams) were thoroughly mixed together. Finally, the diisocyanate terminated prepolymer was added, once again with thorough mixing. The resulting mixture was then degassed in a vacuum system at 30 inches mercury.

A ½ inch diameter hollow polyethylene plastic tube with one end closed was used as a mold. The liquid crystal polyurethane formulation was poured into the vertically-positioned tube. The tube mold was removed by cutting along its length, after allowing 24 hours for the initial cure. The product remained undistrubed for 7 days at room temperature to achieve final cure. The product was a ½ inch diameter rod of polyurethane containing dispersed liquid crystal. Good color reflections were obtained from all surfaces of the cylinder, because of the included black dye.

The highly elastic rod can be stretched, compressed, bent or otherwise deformed to obtain a brilliant color response from the shear sensitivity of the liquid crystals. The color turns to blue when stretched and turns to red when compressed. The formulation has utility in flexible novelty devices or in situations where it is desired to observe a mechanical deformation.

EXAMPLE IV

A biomedical electrically conductive polyurethane was coated with a temperature-sensitive polyurethane liquid crystal dispersion. The electrically conductive polyurethane is filled with carbon black and thus appears as a black background for the polyurethane liquid crystal dispersion top coat. When a current is passed through the conductive layer, it heats by resistance, causing a visual response in the temperature-sensitive top coat.

The carbon black in the conductor was Hughson (TS1960-71) Hughson is a trademark of Hughson Chemical Company. The polyurethane was Spencer Kellogg DV-1984 having a 60 percent solids aliphatic polyether based prepolymer extended with a urethane grade castor oil having an OH value of 165 (Spencer Kellogg DI Castor Oil). The conductor is a heat-activated carbon-filled, polyurethane having a resistivity greater than 200 and less than 500 ohms per square inch and containing about 25 percent solids by weight.

Twenty grams of the conductive polyurethane material was spread evenly 3 mils thick on a flat Teflon baking sheet. Thirty minutes was allowed for solvent evaporation, after which the temperature was slowly raised and held at 260°F for 10 minutes, to unblock and initiate cure. After cooling, the conductive polyurethane was lifted from the sheet and a 1-inch square was cut from a uniform thickness area. A strip of electrically conductive epoxy resin was subsequently applied and allowed to harden at two opposite sides of this square to serve as conductive, low resistance bus bars. These were laid down in a thickness of about 3 mils and a width of about ⅛ inch.

A polyurethane dispersion of liquid crystal is prepared from 4.3 grams of the aforesaid castor oil, 10.32 grams of the 60 percent solids aliphatic prepolymer (DV 1984) and 3.2 grams of a liquid crystal mixture consisting of 30 percent oleyl cholesteryl carbonate, 65 percent cholesteryl nonanoate and 5 percent cholesteryl benzoate.

The selected liquid crystal mixture has a visual response from 37° (red) to 39°C (blue). All three components were added together and mixed with a mechanical stirrer for 5 minutes. This formulation was then vacuum-degassed and applied by brush in a 5 mil layer over the side of the conductive polyurethane film without bus bars. An infrared heat source was then applied and a tack-free dry surface was achieved after 2½ hours at 40°C. Forty-eight hours at room temperature were allowed for a final cure for both polyurethane systems.

By attaching the bus bars formed from the conductive epoxy to a direct current power source, current will flow through the lower electrically conductive polyurethane film, causing heating, which causes a visual response in the upper liquid crystal-bearing layer. The uniformity of the response is, of course, a function of the uniformity in the conductive layer. This type of composite system offers good potential for visual display or visual indication devices in either two-dimensional systems as described above or in other geometric configurations such as bars, rods and the like. As the systems are both polyurethanes, excellent bonding and variable mechanical properties can be produced. Furthermore, since the conductive layer is black, excellent quality color reflections are observed in the reflecting layer.

EXAMPLE V

A moisture curing polyurethane and a shear sensitive (temperature stabilized)mixture of cholesteric liquid crystals yield a formulation which is easily cast and can be used for decorative color coatings or pressure-stress sensitive devices.

A toluene diisocyanate polyester-based polyurethane prepolymer (Hughson TS-2042-2) was used having a free =NCO content of 2.3 percent. This prepolymer was dissolved in toluene (60 percent solids). The liquid crystal was a mixture of 64 percent oleyl cholesteryl carbonate, 30 percent cholesteryl chloride, 5 percent cholesteryl nonanoate, and 1 percent 4-(4-ethoxy phenylazo) phenyl hexanoate (a nematic liquid crystal well known for its ultra-violet absorbing properties).

Twenty grams of the prepolymer was poured into a 3½ inch diameter glass evaporating dish and allowed to evaporate in a dry atmosphere for 24 hours at room termperature (to slightly reduce the percentage of solvent in the system). To this was added 2 percent of a carbonaceous black color concentrate (Conathane DS-1822), thoroughly mixed with an electric stirrer. To this was added 10 grams of the cholesteric mixture. To achieve complete homogeneity, the mixture was then stirred with an electric stirrer at 250 revolutions per minute, and was subsequently degassed under vacuum. The mixture was then poured into a 3½ inch diameter Teflon (a trademark of E. I. du Pont de Nemours Company) coated glass evaporating dish and allowed to cure at ambient conditions at a varying relative humidity of 30–50 percent. As the final sample was approximately ¼ inch thick, the cure took 2 weeks, taking a relatively long time for solvent evaporation and cross-linking via moisture cure to take place.

The cured sample was an iridescent, tough yet flexible polyurethane liquid crystal alloy exhibiting a high degree of sensitivity to any mechanical deformation. The sample was also highly abrasion resistant. This formulation could well be utilized as a coating, for example, in wall tiling to achieve an iridescent appearance; as a human pulse-stress indicator; as a floor tile for intruder detection.

EXAMPLE VI

This example is similar to example V, with the exception that the system was cured with an aromatic diamine, which besides being a catalyst, also served to improve the mechanical properties of the polyurethane dispersion.

The same toluene diisocyanate polyester-based polyurethane prepolymer was used as in Example V (Hughson TS-2042-2). Twenty grams of the prepolymer were evaporated in a 3½ inch diameter glass evaporating dish for 24 hours at room temperature. 11.7 grams of the prepolymer were subsequently mixed with 5 grams of a cholesteric mixture consisting of 65 percent oleyl cholesteryl carbonate, 30 percent cholesteryl chloride, and 5 percent cholesteryl nonanoate and 1 percent of the carbonaceous black dye (Columbia Carbon - "Royal Spectra"). 0.86 grams of the diamine curing agent, 4.4'-methylene-bis-(2-chloroaniline) (MOCA registered trademark of E. I. DuPont de Nemours & Co., Inc.), with a molecular weight of 267, was dissolved in 13 grams of a toluene solution. To minimize the percentage of solvent in the system, the MOCA and toluene solution was heated to just below its boiling point and evaporated until such time as visible re-precipitation of the MOCA was seen, at which time a small amount of toluene was again added to the solution, so as to redissolve the MOCA.

The MOCA and toluene solution was then added to the polyurethane prepolymer-liquid crystal mixture, the system then being thoroughly stirred with an electric stirrer and degassed under vacuum. The mixture was then poured on a eflon coated glass sheet as a thin film and allowed to cure at room temperature.

This sample cured within 6 hours to a tack-free sheet which was similar to Example V but with tougher and more rigid mechanical properties. Optimal color and sensitivity responses from the liquid crystals was not obtained for about a month, probably due to the remaining solvent in the system.

EXAMPLE VII

This example involves a flexible polyurethane lacquer in combination with a shear sensitive liquid crystal mixture suitable for inclusion into other polyurethane systems for coating applications.

The polyurethane used was a highly flexible (750 percent elongation) completely reacted polyester-based aliphatic polyisocyanate lacquer (Spencer Kellogg - XP-2483). This polyurethane lacquer contained 30 percent non-volatile solids and cured by solvent (toluene/isopropyl alcohol) evaporation. The liquid crystal mixture was a temperature-insensitive aromatic system composed of the following: 43.8 percent p-methoxybenzylidene-p-n-butylaniline (MBBA), 21.9 percent cholesteryl chloride, 24.7 percent cholesteryl pelagonate (nonanoate) and 9.6 percent cholesteryl cinnamate.

2.5 grams of the liquid crystal mixture was dissolved in an equal weight of toluene, and mixed thoroughly with an electric stirrer into 14.0 grams of the polyurethane lacquer.

This mixture, highly viscous despite the high solvent content, was spread into a thin film and allowed to cure at room temperature, the cure taking about 1 hour. The resultant film is highly iridescent, highly elastic, and as a result the color response of the liquid crystals to deformation was excellent.

This produce is an interesting material to be used as an iridescent coating for clothing or an iridescent coating for furniture.

EXAMPLE VIII

Temperature sensitive liquid crystal was dispersed in a moisture-cure polyurethane system suitable for coating black or dark-colored substrates.

A prepolymer was prepared from TDI (toluene diisocyanate, 80/20 and a polytetramethylene ether glycol having an OH value of 57.5. The prepolymer had a free =NCO content of 3.86 percent. 12.93 grams of the described prepolymer were combined with 10.0 grams of polytetramethylene ether glycol having an OH value of 57.5. These ingredients were then mixed with 58 grams of anhydrous xylene, 14 grams anhydrous tetrahydrofuran and 0.02 grams of dibutyl tin dilaurate. The mixture was refluxed in dry nitrogen for 6 hours.

22.6 grams of the solution was mixed with 3.0 grams of temperature sensitive liquid crystal mixture containing, by weight
    25 percent cholesteryl oleyl carbonate
    10 percent cholesteryl benzoate
    65 percent cholesteryl nonanoate Then 1.25 grams of the described prepolymer was mixed into the solution which was thereafter applied as a coating to black surfaces. The coating cured by reaction with atmospheric moisture after the solvent evaporated. The coating was tough, highly cross-linked and temperature sensitive. When localized heating was applied to the coating by directing a stream of hot air against the coating, a corresponding localized color change from red through green to blue was observed.

This material may be applied as a film over a dark area of any body whose temperature is to be indicated. At the selected temperature (determined by the specific liquid crystal) a visible indication of temperature will be presented.

EXAMPLE IX

Temperature sensitive liquid crystals were mixed with a carbonaceous black dye and the mixture was dispersed in polyurethane elastomer forming ingredients which were allowed to cure.

The following ingredients were mixed:
    2.0 grams polyoxypropylene diol, OH number 54.8
    0.025 gram small particle carbon black powder
    0.175 gram N,N,N',N'-tetrakis (2-hydroxypropyl ethylene diamine)
    3.5 grams temperature sensitive liquid crystal mixture containing, by weight
        23 percent cholesteryl oleyl carbonate
        10 percent cholesteryl benzoate
        67 percent cholesteryl nonanoate
    0.2 gram triethylene diamine in dipropylene glycol These ingredients were mixed for 5 hours at 50°C, then degassed under vacuum. Thereafter 5.0 grams of the prepolymer described in Example VIII was mixed into the mixture for 5 minutes followed by further degassing. A draw-down film of the mixture was applied by a 6-mil draw-down blade on a clean glass plate. The film cured at 45°C for 48 hours. Final cure was achieved in 10 days. The film was elastic with a very low modulus of elasticity, suitable for thermal mapping. An operator's hand was cooled by wiping alcohol across the back of the hand. The film was stretched across the cooled back of the hand. A color change was observed from black to lighter colors along the vein-patterns.

EXAMPLE X

Liquid crystals were mixed into a urethane lacquer. The following ingredients were mixed at 50°C:
    11.7 grams of the prepolymer described in Example VIII
    10.0 grams polytetramethylene ether glycol, functionality of 2 and OH number 55.6
    0.02 grams dibutyl tin dilaurate The mixture was degassed and allowed to cure in a 30-mil thick sheet at room temperature in a dry atmosphere. After 7 days a linear polymer sheet was recovered. 1.23 grams of the sheet was dissolved in 11.7 grams of xylene. To the xylene solution 0.6 grams of a thermally stabilized liquid crystal mixture was added comprised of, by weight
    65 percent cholesteryl oleyl carbonate
    35 percent cholesteryl chloride The liquid lacquer is a stable solution which can be sprayed or brushed or dipped on a dark substrate to provide attractive iridescent coatings upon evaporation of the solvent.

This material can function as a memory coating. A black acrylic sheet was coated with 6-mil film of this material. When scratched with a stylus, a visible trace remains for an extended period —weeks or months. When the film is heated and the dispersed liquid crystal is restored to its isotropic state, the trace disappears.

EXAMPLE XI

An elastic cross-linked polyurethane casting containing temperature sensitive liquid crystals.

The following ingredients were mised for twenty minutes at 40°C:
    1.75 grams polytetramethylene ether glycol, having OH number 57.5
    0.18 gram N,N,N',N'-tetrakis 2-hydroxypropyl ethylene diamine
    3.5 grams liquid crystal mixture containing as parts by weight
        25 parts cholesteryl oleyl carbonate
        10 parts cholesteryl benzoate
        65 parts cholesteryl nonanoate
        1 part soluble black dye
    0.01 gram stannous octoate The mixture was degassed under vacuum and thereafter 5.0 grams of the prepolymer of the three previous examples was added and mixed at 40°C for 5 minutes. A second degassing was carried out under vacuum. Then the mixture was cast as a 6-mils thick film on a glass plate with 6-mil draw-down blade. The casting was oven-cured for 4 hours at 40°C.

When heated air was directed to localized areas of the film, localized color changes are observed. The 100 percent elongation modulus of the film was 108 psi.

EXAMPLE XII

Example XI was repeated with two substitutions, namely, the content of polytetramethylene ether glycol was 2.35 grams and the content of N,N,N',N'-tetrakis 2-hydroxypropyl ethylene diamine was 0.07 grams.

The resulting film had the same optical response of the film of Example XI, but had a lower modulus of elasticity, specifically the 100 percent elongation modulus was 72 psi.

EXAMPLE XIII

A temperature sensitive liquid crystal mixture was dispersed in an elastic polyurethane.

The following ingredients were mixed:
    1.94 grams polyoxypropylene glycol, OH value 26.6
    0.6 gram polyoxypropylene derivative of glycerine. OH value of 656.5, a triol 2.0 grams of a liquid crystal mixture containing by weight
  10 percent cholesteryl oleyl carbonate
  90 percent cholesteryl nonanoate
0.05 gram carbonaceous black pigment (mixed into the liquid crystal mixture)

These ingredients were mixed at 40°C for 15 minutes and thereafter 5.05 grams of a TDI prepolymer was added. The TDI prepolymer was formed from TDI (toluene diisocyanate 80/20) and polyoxypropylene glycol (OH value 26.6) so that the prepolymer has a free=NCO content of 9.09 percent. This mixture was stirred for 10 minutes at room temperature and vacuum degassed. Thereafter 0.05 gram dibutyl tin dilaurate was stirred into the mixture as a catalyst for 5 minutes and the mixture was cast on a glass plate as a 10-mils thick film with a tenmil drawdown blade. The film cured for 3 hours in an oven at 45°C. The film was slightly tacky at that time, but presented good thermographic response, that, the film changed color locally when heated locally.

EXAMPLE XIV

A two-layered polyurethane coating system comprises a black polyurethane film as a base coat and a liquid crystal dispersion as a top coat.

Preparation of base coat: The following ingredients were mixed as a base coat:
  3.04 grams polyoxypropylene glycol, OH value 56
  0.2 gram polyoxypropylene glycol derivative of trimethylol propane, OH value 398
  0.5 gram carbonaceous black dye These ingredients were mixed at 40°C and degassed under vacuum. Then 5.0 grams of TDI prepolymer was added to the mixture. This TDI prepolymer was prepared from toluene diisocyanate (80/20) and polyoxyethylene glycol (OH value 54.8) with a free =NCO content of 6.66 percent. Then 0.03 gram of stannous octoate catalyst was added. The mixture was stirred, degassed and cast as a 2-mils film on a glass plate with a 2-mil drawdown blade. The film was cured in an oven at 45°C for 45 minutes.

Preparation of the top coat: The base coating formulation just described was duplicated except that the carbonaceous black dye was omitted and 3.0 grams of a liquid crystal mixture was employed in its stead.

The liquid crystal mixture contained, by weight
  23 percent cholesteryl oleyl carbonate
  40 percent cholesteryl laurate
  35 percent cholesteryl benzoate A 3-mils film of this top coating was applied on the base coat by means of a 3-mils drawdown blade. The laminated film was cured at 50°C for 20 hours. The film exhibited localized color changes when locally heated.

We claim:

1. A polymerized polyurethane elastomer which is a reaction product of at least one organic polyisocyanate and at least one organic compound containing at least one active hydrogen according to the Zerewitinoff method,
  said elastomer having uniformly dispersed therethrough naked aggregates of liquid crystals which provide a visible response to application of energy said liquid crystals having a particle size of 0.1 to 300 microns and wherein the said liquid crystals constitute at least 20 per cent of the weight of the elastomer.

2. A film comprising the elastomer of claim 1 having a thickness of 0.5 to 20 mils.

3. The elastomer of claim 1 wherein the said liquid crystals comprise at least one cholesteric liquid crystal.

4. The elastomer of claim 3 wherein the said liquid crystal is temperature stabilized and provides a first visible indication when stretched and a second visible indication when compressed.

5. A cast article comprising the elastomer of claim 4 which exhibits a first color change when stretched and a second color chanbe when compressed.

6. The polymerized polyurethane of claim 1 wherein the said liquid crystals contain 0.5 to 5 percent by weight of at least one dark dye.

7. The polymerized polyurethane elastomer of claim 1 wherein the said naked aggregates contain 1 to 5 percent of an ultraviolet radiation absorber. 31

8. The elastomer of claim 3 wherein the said liquid crystal is temperature insensitive at temperatures below 100°F.

9. A coating composition comprising a mixture of thermoplastic polyurethane polymer in a volatile nonaqueous solvent,
  said composition containing a dispersion of naked aggregates of liquid crystals having a particle size of 0.1 to 300 microns which provide visible response to the application of energy,
  the weight ratio of said liquid crystals to said polymer being at least 0.3.

10. The coating composition of claim 9 wherein the said liquid crystals comprise at least one cholesteric liquid crystal.

11. An elastic article formed from a polymerized polyurethane elastomer having a modulus of elasticity less than 5,000 psi and containing at least 20 percent by weight of a cholesteric liquid crystal dispersed as naked aggregates, having a particle size of 0.1 to 300 microns
  said article exhibiting transitory color changes towards shroter wave lengths when stretched and towards longer wave lengths when compressed.

12. A temperature indicating device having a supporting substrate and a coating over at least one portion of its surface,
  said coating being formed from the composition of claim 1 and having a liquid crystal ingredient which exhibits a visible response at a preselected temperature.

13. The elastomer of claim 1 wherein the said naked aggregates have a particle size in the range of 0.5 to 50 microns.

14. A film as defined in claim 2 which is elastic and self-supporting.

15. A temperature indicating device including a dark colored area on the surface of a body whose temperature is to be indicated and a film as defined in claim 2 applied over the said dark colored area.

16. A method for preparing a polyurethane elastomer which comprises combining in a single mixture
  A. organic polyisocyanate;
  B. a co-reactive compound having at least one active hydrogen by the Zerewitinoff method;
  C. liquid crystals which provide a visible response to the application of energy, said liquid crystals comprising at least 30 percent by weight of said mixture;
  dispersing the said liquid crystals in naked aggregates having a particle size from 0.1 to 300 microns uniformly throughout the said mixture;
  casting the said mixture into a selected shape; and
  curing the said mixture at a temperature below the degradation temperature of the said liquid crystals.

* * * * *